(12) United States Patent
Mann

(10) Patent No.: US 7,946,256 B2
(45) Date of Patent: May 24, 2011

(54) PROTECTIVE HEAD COVER FOR AN ANIMAL AND METHOD OF USING THE SAME

(76) Inventor: Robert E. Mann, Boise, ID (US)

( * ) Notice: Subject to any disclaimer, the term of this patent is extended or adjusted under 35 U.S.C. 154(b) by 184 days.

(21) Appl. No.: 12/480,992

(22) Filed: Jun. 9, 2009

(65) Prior Publication Data

US 2010/0307427 A1 Dec. 9, 2010

(51) Int. Cl.
A01K 13/00 (2006.01)
(52) U.S. Cl. ......................................................... 119/850
(58) Field of Classification Search .................. 119/814, 119/815, 821, 850, 855–858, 863, 865, 174; 2/172, 209; 54/79.1–79.4, 80.1–80.5, 67; D30/152, 145
See application file for complete search history.

(56) References Cited

U.S. PATENT DOCUMENTS

| 93,325 | A | * | 8/1869 | McIntosh | 54/80.1 |
| 1,179,473 | A | * | 4/1916 | Taylor | 2/172 |
| 2,021,144 | A | * | 11/1935 | Beck | 2/174 |
| 2,136,115 | A | * | 11/1938 | McCaleb | 54/80.1 |
| 2,405,326 | A | * | 8/1946 | Plotsky | 2/209 |
| 3,753,334 | A | | 8/1973 | Blessing | |
| 4,040,239 | A | | 8/1977 | Powell | |
| 4,221,189 | A | | 9/1980 | Olvera | |
| 4,233,942 | A | | 11/1980 | Williams | |
| 4,662,156 | A | | 5/1987 | Oettel | |
| 4,964,264 | A | * | 10/1990 | Adams | 54/80.1 |
| 4,969,317 | A | | 11/1990 | Ode | |
| 5,038,412 | A | * | 8/1991 | Cionni | 2/209 |
| 5,163,272 | A | * | 11/1992 | Finley et al. | 54/80.1 |
| 5,395,400 | A | * | 3/1995 | Stafford et al. | 607/109 |
| 5,456,215 | A | | 10/1995 | Deutscher et al. | |
| 6,050,068 | A | | 4/2000 | White, Jr. | |
| 6,128,891 | A | | 10/2000 | McMahon | |
| 6,314,961 | B1 | * | 11/2001 | Barnes | 128/864 |
| D459,559 | S | | 6/2002 | Jong | |
| 7,204,071 | B1 | | 4/2007 | Walker et al. | |
| 2007/0068124 | A1 | | 3/2007 | Dyck et al. | |
| 2007/0084156 | A1 | | 4/2007 | Andrews | |
| 2009/0178628 | A1 | * | 7/2009 | Carmean et al. | 119/850 |

\* cited by examiner

*Primary Examiner* — Rob Swiatek
*Assistant Examiner* — Ebony Evans
(74) *Attorney, Agent, or Firm* — Buchanan Nipper

(57) ABSTRACT

A stable and secure protective cover for an animal, the head cover having an inner shell with a pair of ear slits therethrough for allowing the animal's ears to extend through the inner shell and an outer shell for sandwiching the animal's ears between the inner and outer shells thereby providing for stable and secure protection of the animal's ear canals from entry by foreign matter such as cheat grass seed.

16 Claims, 4 Drawing Sheets

PROTECTIVE HEAD COVER FOR AN ANIMAL AND METHOD OF USING THE SAME

FIELD OF THE INVENTION

The present invention generally relates to animal husbandry and more particularly relates to head coverings for protecting an animal's ears from intrusion by foreign matter.

BACKGROUND OF THE INVENTION

Certain types of animals are prone to getting ear infections caused by foreign matter entering into their ear canals, for instance, it is not uncommon for certain types of bird hunting dogs to spend a considerable amount of time in an area inundated with cheat grass and other abrasive plant materials. It is not uncommon for such dogs to end up with cockleburs in their fur and cheat grass seeds lodged in their ear canal. This lodged cheat grass, in particular, can be source of infection and high vet bills for the owner of the dog. What is needed is an apparatus for covering a dog's ear canals that is comfortable for the dog to wear, not prone to snagging in brush, and generally likely to stay in place upon the dog's head as the dog walks through grass and brush.

DESCRIPTION OF THE PREFERRED EMBODIMENTS

Figure 1:
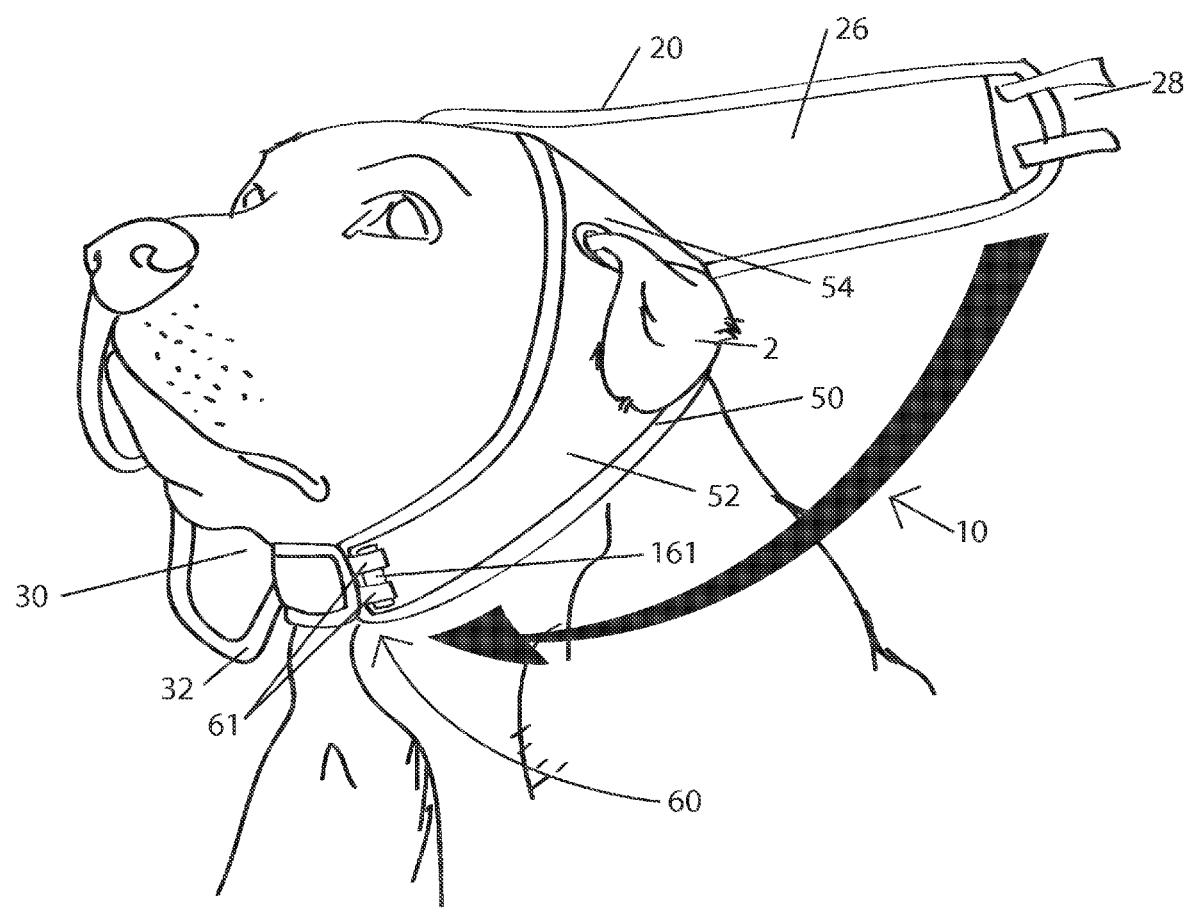
FIG. 1 shows a perspective, environmental view of a first embodiment of the present invention, the embodiment shown worn on the head of a dog with the outer flap not yet covering the dog's ear.
Figure 2:
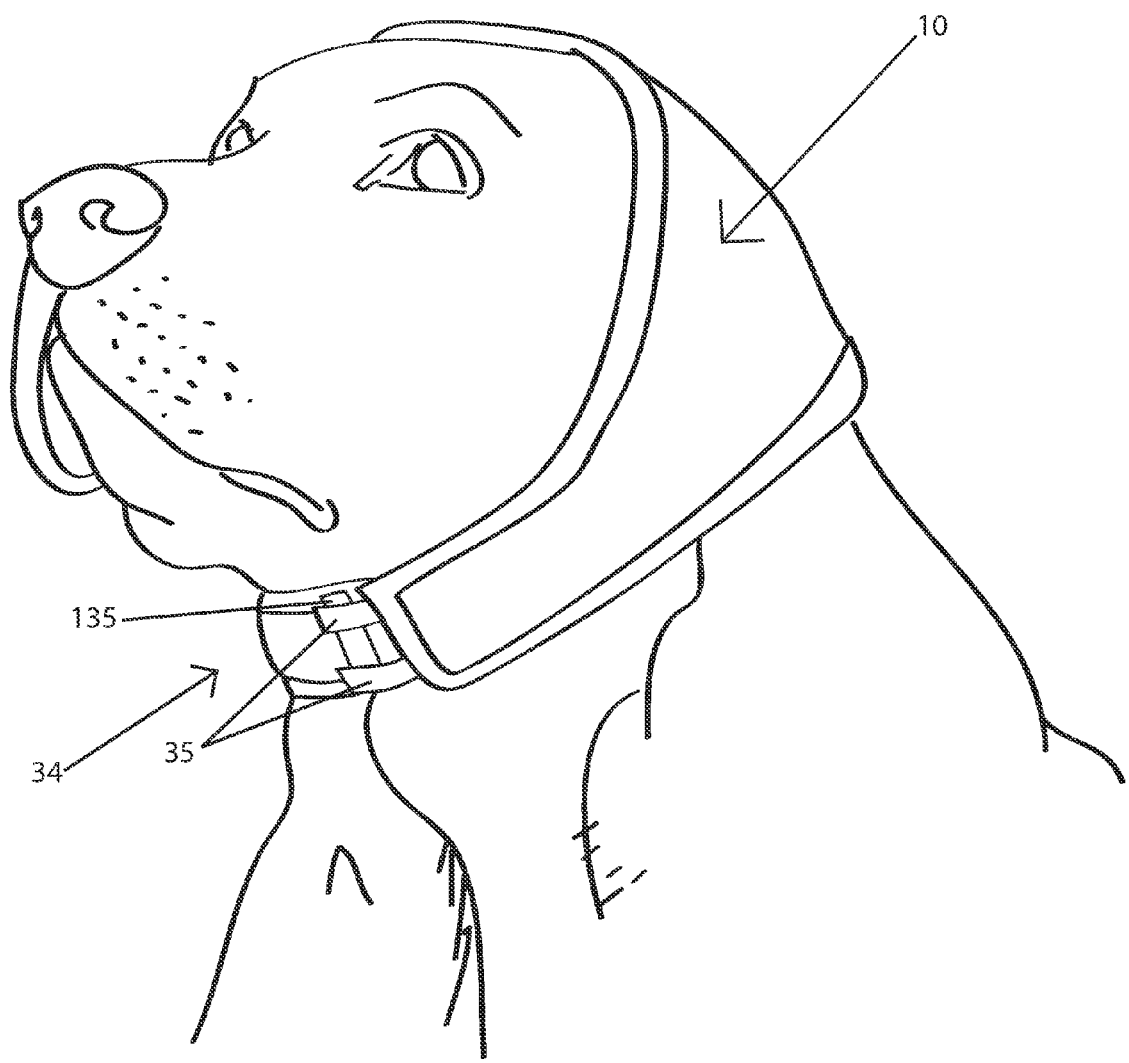
FIG. 2 shows a perspective, environmental view of the embodiment of FIG. 1 showing the left cover extending over and protecting the left ear of the dog with the chin strap attached under the dog's chin.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The Figures show a protective head cover 10 being worn by a dog. The dog having a head, a left ear, a right ear (not shown), neck and a chin. The head covering comprising an inner shell and an outer shell that sandwich the dog's ear in between the two shells and cooperate to cover the dog's ears.

The inner shell 50 comprises a left flap 52 and a right flap 56. The left flap has a left ear slit 54 for receiving the left ear 2 of the animal therethrough, and the right flap 56 has a right ear slit 58 for receiving the right ear (not shown in the drawings) therethrough. It is preferred that, when being worn, that a substantial portion of the ear extend through the ear slit so that the ear slit itself rests generally adjacent to the ear canal of the animal. It is also preferred that the inner shell 50 comprise an inner chin strap 60 that extends between the left and right flaps. The inner chin strap is configured for securing around the neck and under the animal's chin when the protective head cover is being worn on the animal's head. When thusly worn, the inner shell will generally be tightly attached to the animal's head, wrapping around the animal's head with the animal's ears extending through the slits. It is preferred that the inner chin strap comprises a hook and loop fastener, such as the hook straps 61 and the loop pad 161 shown in the figures.

The inner shell 50, preferably along a center line, attaches to the outer shell 20. Optionally, the inner shell could comprise two different flaps that extend downwards from the outer shell.

The outer shell 20 comprises a left cover 30 and a right cover 26. The outer shell also comprises an outer chin strap 34 that extends between the left and right covers. This outer chin strap is configured for securing around the neck and under the animal's chin, preferably on top of the inner chin strap, thereby sandwiching the animal's ears between the inner and outer shells. It is preferred that the outer chin strap comprises a hook and loop fastener, such as the hook straps 35 and the loop pad 135 shown in the figures.

It is preferred that both the flaps and the covers be wider than the animal's ears, thereby preventing entry into the ear canal by foreign objects such as cheat grass seeds.

Figure 4:
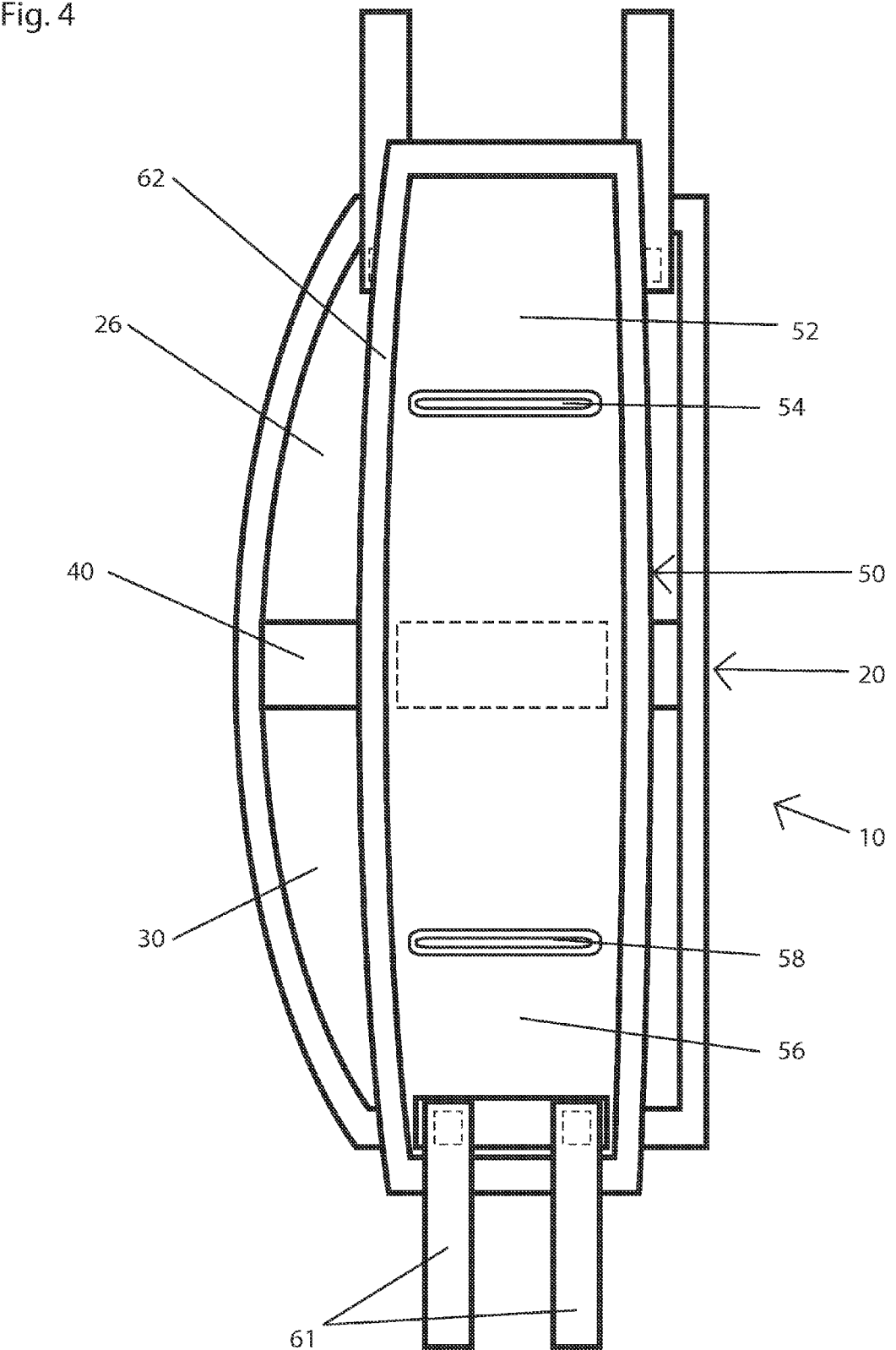
FIG. 4 shows a bottom plan view of the embodiment of FIG. 1.

It is preferred that the protective head cover 10 further comprise a dorsal stiffener 40, as indicated in FIG. 4. The dorsal stiffener can attach to the cover any number of ways, including by being adhered to the inner shell or the outer shell. In the embodiment shown in the figures, the inner and outer shells are comprised of fabric, with the outer shell having a pair of layers of fabric with the dorsal stiffener sewed there-between generally along the center line of the cover.

The dorsal stiffener 40 serves to minimize movement of the protective head cover 10 in anterior (towards the animal's nose) and posterior (towards the animal's tail) directions. It is preferred that the dorsal stiffener comprise a thin strip of malleable (flexible) metal. The user, upon placing the cover 10 upon the head of the animal, such as a dog, can by hand gently shape the dorsal stiffener the general dorsal shape of the cranium of the animal on which it is installed upon; thereby making the cover fit the animal better.

Minimizing the movement in anterior and posterior directions (as done by the dorsal stiffener) while preventing dorsal and ventral rotation of the head cover on the animal's head (as done by the animal's ears extending through the left and right ear slits), results in the creation of a protective head cover which, once installed upon a animal's head, stays in place.

In that animal's head shapes are different, particularly between breeds (for instance, dog breeds), the protective head cover can be custom fit to the animal on which it is used, either by changing the shape after it is put on the animal's head or by bending the dorsal stiffener appropriately before installation of the animal's head. Because the dorsal stiffener is form fitting to the animal's cranium, the head cover is less likely to slide forward or backward, (as discussed previously) on the animal's head.

Also included is the method of using the apparatus. For instance, a method of protecting animal's ear canals from foreign objects where the animal has a head at the top, a left ear, and a right ear, and the method comprises the steps of: placing the protective cover on the top of the animal's head, inserting the animal's ear through the left ear slit, inserting the right ear through the right ear slit, securing the inner chin strap under the animal's chin, covering the animal's left ear with the left cover, covering the animal's right ear with the right cover, and securing the outer chin strap under the animal's chin, thereby sandwiching the animal's ears between the inner and outer shells.

In this method embodiment, the inner shell comprises a left flap and a right flap, the left flap having a left slit for receiving the left ear therethrough and the right flap having a right ear slit for receiving the right ear slit therethrough, the inner shell further comprising an inner chin strap extended between the left and right flaps, this inner chin strap configured for securing around the neck and under the animal's chin. Regarding the outer shell, the outer shell comprises a left cover and a right cover, the outer shell further comprising an outer chin strap extending between the left and right covers, the outer chin strap configured for securing around the neck and under the animal's chin, on top of, preferably, the inner chin strap, thereby sandwiching the animal's ears between the inner and outer shells.

Figure 3:
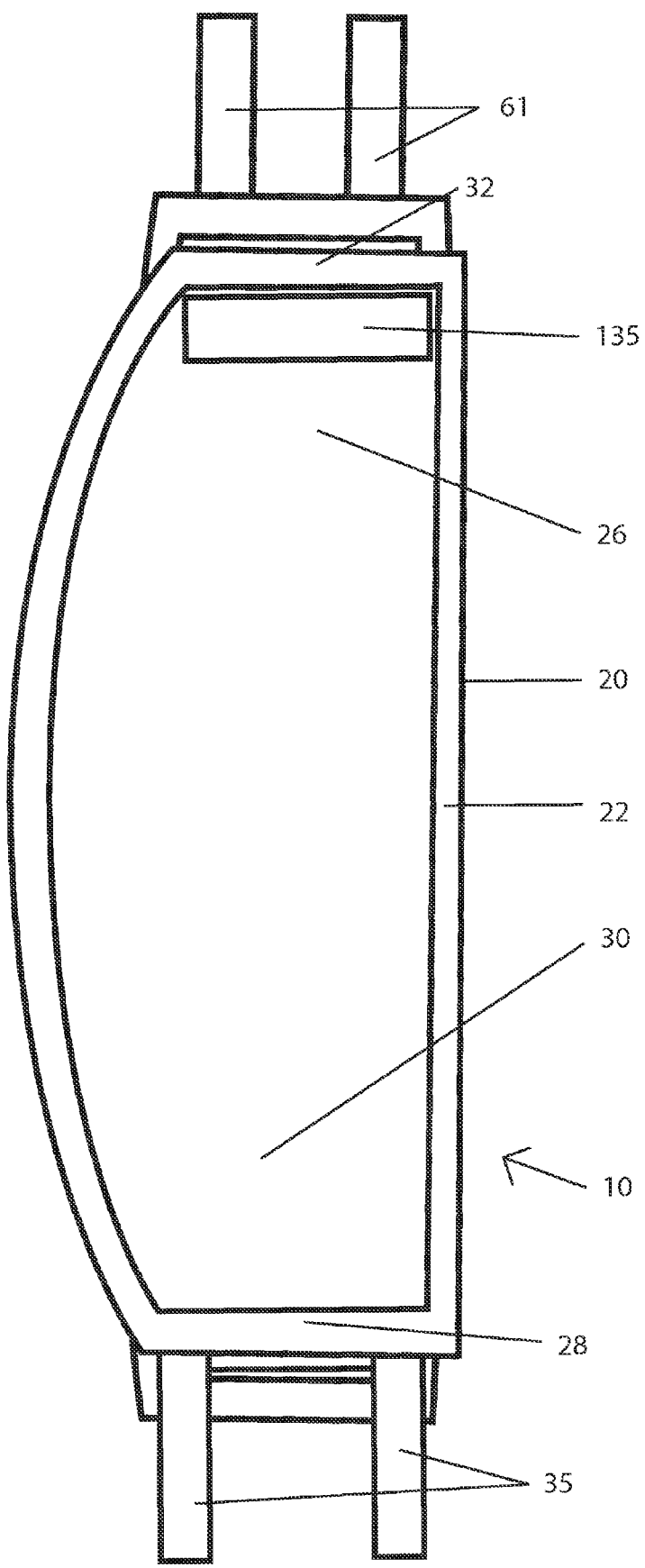
FIG. 3 shows a top plan view of the embodiment of FIG. 1.

FIGS. 3 and 4 show a sewn rim 22, 28 and 32 on the outer shell and a sewn rim 62 on the inner shell. Such configuration is optional.

The present invention also, due to the utilization of the dorsal stiffener, enables a head covering (e.g., baseball cap, hat, bandana) to be worn on the head of the animal, with the dorsal stiffener and/or the outer shell providing a surface upon which the head covering's rear portion can attach.

As shown in FIGS. 3 and 4, it is preferred that the center of the outer shell be wider than the portion of the outer shell adjacent the left cover end portion and right cover end portion; such a configuration allowing the protective head cover to sit higher on the animal's head while helping to hold the ears down and utilizing the dog's neck to stabilize the attachment.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

The purpose of the Abstract of the Disclosure is to enable the public, and especially the scientists, engineers, and practitioners in the art who are not familiar with patent or legal terms or phraseology, to determine quickly from a cursory inspection, the nature and essence of the technical disclosure of the application. The Abstract of the Disclosure is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

What is claimed is:

1. A protective head cover for an animal, said animal having a head, a left ear, a right ear, a neck, and a chin, said head cover comprising:

an inner shell having opposite ends, said inner shell comprising a left flap and a right flap, said left flap having a left ear slit for receiving said left ear there-through, said right flap having a right ear slit for receiving said right ear slit there-through, said inner shell further comprising an inner chin strap extending between the left and right flaps, said inner chin strap configured for securing around the animal's neck and under said animal's chin; and an outer shell having opposite ends for covering said animal's ears, said outer shell comprising a left cover and a right cover, said outer shell further comprising an outer chin strap extending between the left and right covers, said outer chin strap configured for securing around the neck and under said animal's chin thereby sandwiching said animal's ears between said inner and outer shells.

2. The protective head cover of claim 1, wherein said flaps are wider than one of said animal's ears.

3. The protective head cover of claim 1, wherein said covers are wider than one of said animal's ears.

4. The protective head cover of claim 1, wherein said outer shell generally has a center line separating said left cover from said right cover, said protective cover comprising a dorsal stiffener oriented along said center line, wherein said dorsal stiffener serves to minimizes movement of the protective head cover in anterior and posterior directions.

5. The protective head cover of claim 4, wherein said dorsal stiffener comprises a strip of flexible metal able to be molded to the general dorsal shape of said animal's head, said dorsal stiffener attaching to said outer shell.

6. The protective head cover of claim 1, wherein said the animal's ears extending through said left and right ear slits serve to minimize dorsal and ventral rotation of the head cover on the animal's head.

7. The protective head cover of claim 1, wherein said outer chin strap comprises a hook-and-loop fastener.

8. The protective head cover of claim 1, wherein said inner chin strap comprises a hook-and-loop fastener.

9. A protective head cover for an animal, said animal having a head, a left ear, a right ear, neck, and a chin, said head cover comprising:

an inner shell, said inner shell comprising a left flap and a right flap, said left flap having a left ear slit for receiving said left ear there-through, said right flap having a right ear slit for receiving said right ear slit there-through, said inner shell further comprising an inner chin strap extending between the left and right flaps, said inner chin strap configured for securing under said animal's chin; and an outer shell for covering said animal's ears, said outer shell comprising a left cover and a right cover, said outer shell further comprising an outer chin strap extending between the left and right covers, said outer chin strap configured for securing around the neck and under said animal's chin thereby sandwiching said animal's ears between said inner and outer shells, wherein said outer shell generally has a center line separating said left cover from said right cover; and a dorsal stiffener oriented along said center line, wherein said dorsal stiffener serves to minimize movement of the protective head cover in anterior and posterior directions.

10. The protective head cover of claim 9, wherein said animal's ears extending through said left and right ear slits serve to minimize dorsal and ventral rotation of said protective head cover on said animal's head.

11. The protective head cover of claim 9, wherein said flaps are wider than one of said animal's ears.

12. The protective head cover of claim 9, wherein said covers are wider than one of said animal's ears.

13. The protective head cover of claim 9, wherein said dorsal stiffener comprises a strip of flexible metal able to be molded to the general dorsal shape of said animal's head, said dorsal stiffener attaching to said outer shell.

14. The protective head cover of claim 9, wherein said outer chin strap comprises a hook-and-loop fastener.

15. The protective head cover of claim 9, wherein said inner chin strap comprises a hook-and-loop fastener.

16. A method of protecting an animal's ear canals from foreign objects, said animal having a head with a top, a left ear and a right ear, said method comprising the steps of:

providing a protective head cover, said protective head cover comprising:

an inner shell, said inner shell comprising a left flap and a right flap, said left flap having a left ear slit for receiving said left ear there-through, said right flap having a right ear slit for receiving said right ear slit there-through, said inner shell further comprising an inner chin strap extending between the left and right flaps, said inner chin strap configured for securing under said animal's chin, and an outer shell for covering said animal's ears, said outer shell comprising a left cover and a right cover, said outer shell further comprising an outer chin strap extending between the left and right covers, said outer chin strap configured for securing under said animal's chin thereby sandwiching said animal's ears between said inner and outer shells;

placing said protective head cover on the top of said animal's head;

inserting left ear through said left ear slit;

inserting right ear through said right ear slit;

securing said inner chin strap under said animal's chin;

covering said animal's left ear with said left cover;

covering said animal's right ear with said right cover; and securing outer chin strap under said animal's chin thereby sandwiching said animal's ears between said inner and outer shells.

\* \* \* \* \*